(12) United States Patent
Guo et al.

(10) Patent No.: US 7,489,656 B2
(45) Date of Patent: Feb. 10, 2009

(54) BANDWIDTH ALLOCATION

(75) Inventors: Zihua Guo, Beijing (CN); Jun Zhao, Beijing (CN); Richard Yuqi Yao, Morris Plains, NJ (US); Wenwu Zhu, Basking Ridge, NJ (US)

(73) Assignee: Microsoft Corporation, Redmond, WA (US)

( * ) Notice: Subject to any disclaimer, the term of this patent is extended or adjusted under 35 U.S.C. 154(b) by 824 days.

(21) Appl. No.: 10/808,017

(22) Filed: Mar. 23, 2004

(65) Prior Publication Data

US 2005/0213503 A1 Sep. 29, 2005

(51) Int. Cl.
*H04Q 7/00* (2006.01)
(52) U.S. Cl. .................. 370/329; 370/442; 370/468
(58) Field of Classification Search ........... None
See application file for complete search history.

(56) References Cited

U.S. PATENT DOCUMENTS

| 5,594,738 | A | 1/1997 | Crisler et al. | 370/347 |
|---|---|---|---|---|
| 6,765,873 | B1 * | 7/2004 | Fichou et al. | 370/235 |
| 7,127,254 | B2 * | 10/2006 | Shvodian et al. | 455/450 |
| 7,283,562 | B2 * | 10/2007 | Bellows | 370/468 |
| 2001/0043613 | A1 | 11/2001 | Wibowo et al. | 370/468 |
| 2003/0152059 | A1 | 8/2003 | Odman | 370/338 |
| 2005/0013267 | A1 * | 1/2005 | An | 370/328 |

OTHER PUBLICATIONS

IEEE P802.15, Draft D17 Clause 7.6 Security Recommendation for Low-Rate IEEE 802.15.4 WPAN, 130 pages, Nov. 2002.*
Draft Standard for Telecommunications and Information Exchange Between Systems—LAN/MAN Specific Requirements—Part 15.3: Wireless Medium Access Control (MAC) and Physical Layer (PHY) Specifications for High Rate Wireless Personal Area Networks (WPAN), Draft P802.15.3/D17, Feb. 2003, 340 pages.
"Performance and simulation analysis of 802.15.3 QoS", Mangharam et al., IEEE 802.15.3 WG, doc.: IEEE 802.15-02/297r1, Jul. 2002, slides 1-20.
"Samung MAC enhancement contrigution for IEEE 802.15 Task Group 3a/ Application-aware Channel Time Allocation for High Rate WPAN", Kim et al., IEEE 802.15.3 WG, doc.:IEEE 802.15-03/212rl, May 2003, pp. 1-17.
"MPEG-4 and H.263 video traces for network performance evaluation", Fitzek et al., IEEE Network, vol. 15, No. 6, pp. 40-54, Dec. 2001, http://www-tkn.ee.tu-berlin.de/~fitzek/TRACE/trace.html.
"Radio resource sharing for ad hoc networking with UWB", Cuomo et al., IEEE J. Select. Areas Commun., vol. 20, No. 9, pp. 1722-1732, Dec. 2002.
"IEEE 802.15 TG3 and SG3a", John Barr, available at: www.fcc.gov/oet/tac/april26-02-docs/FCC-TAC-802.15.3-overviewNOPICT.ppt, Apr. 2002, 24 pages.

* cited by examiner

*Primary Examiner*—Frank Duong
(74) *Attorney, Agent, or Firm*—Lee & Hayes, PLLC

(57) ABSTRACT

In accordance with certain described implementation(s), a coordinating device performs bandwidth allocation procedures based on information from previously-unfulfilled bandwidth allocation requests and responsive to current bandwidth allocation requests. The current bandwidth allocation requests stipulate current requested bandwidth amounts for multiple streams, and the current bandwidth allocation requests may be received from multiple entities having the multiple streams. The information from previously-unfulfilled bandwidth allocation requests is taken into account when allocating available bandwidth between/among the multiple streams of the multiple entities for the current requested bandwidth amounts.

34 Claims, 8 Drawing Sheets

BANDWIDTH ALLOCATION

TECHNICAL FIELD

This disclosure relates in general to bandwidth allocation and in particular, by way of example but not limitation, to allocating currently-available bandwidth responsive to unserviced bandwidth amounts from previous bandwidth allocation requests.

BACKGROUND

Computer networks have facilitated the exchange of information for decades. Such computer networks include both wired networks and wireless networks. Historically, wired networks such as local area networks (LANs) that operate in accordance with e.g. an IEEE 802.3 standard were commonly created. Recently, wireless networks that operate in accordance with e.g. an IEEE 802.11 us or 802.15 standard are becoming more prevalent. Wireless networks that comport with IEEE 802.11 are typically referred to as wireless LANs (WLANs). Wireless networks that comport with IEEE 802.15.3 are typically referred to as wireless personal area networks (WPANs).

IEEE 802.15.3 in particular defines a physical layer and a Medium Access Control (MAC) layer for WPAN systems. IEEE 802.15.3 WPAN typically relates to wireless ad hoc networks that allow a number of devices to communicate with each other. Such networks are often termed piconets. A set of devices forming a given piconet share a limited available transmission bandwidth in a variable and often changing manner. One device of the set of devices is established as the piconet coordinator.

The piconet coordinator is responsible for system timing, quality of service (QoS) control, power management, security, and so forth. The piconet coordinator is also capable of distributing the available limited bandwidth among the various other devices of the set of devices of a given piconet. However, the IEEE 802.15.3 standard is open with regard to appropriate algorithms to employ and/or factors to consider when distributing the limited bandwidth. Unfortunately, poor bandwidth distribution can result in inefficient use of the available limited bandwidth as well as an unacceptable job failure rate (JFR), especially for real-time communications such as those for streamed video.

Accordingly, there is a need for schemes and/or techniques that can allocate limited bandwidth among multiple streams in an effective manner.

SUMMARY

In accordance with certain described implementation(s), a coordinating device performs bandwidth allocation procedures based on information from previously-unfulfilled bandwidth allocation requests and responsive to current bandwidth allocation requests. The current bandwidth allocation requests stipulate current requested bandwidth amounts for multiple streams, and the current bandwidth allocation requests may be received from multiple entities having the multiple streams. The information from previously-unfulfilled bandwidth allocation requests is taken into account when allocating available bandwidth between/among the multiple streams of the multiple entities for the current requested bandwidth amounts.

Other method, system, approach, apparatus, device, media, procedure, arrangement, etc. implementations are described herein.

BRIEF DESCRIPTION OF THE DRAWINGS

The same numbers are used throughout the drawings to reference like and/or corresponding aspects, features, and components.

DETAILED DESCRIPTION

Figure 1:
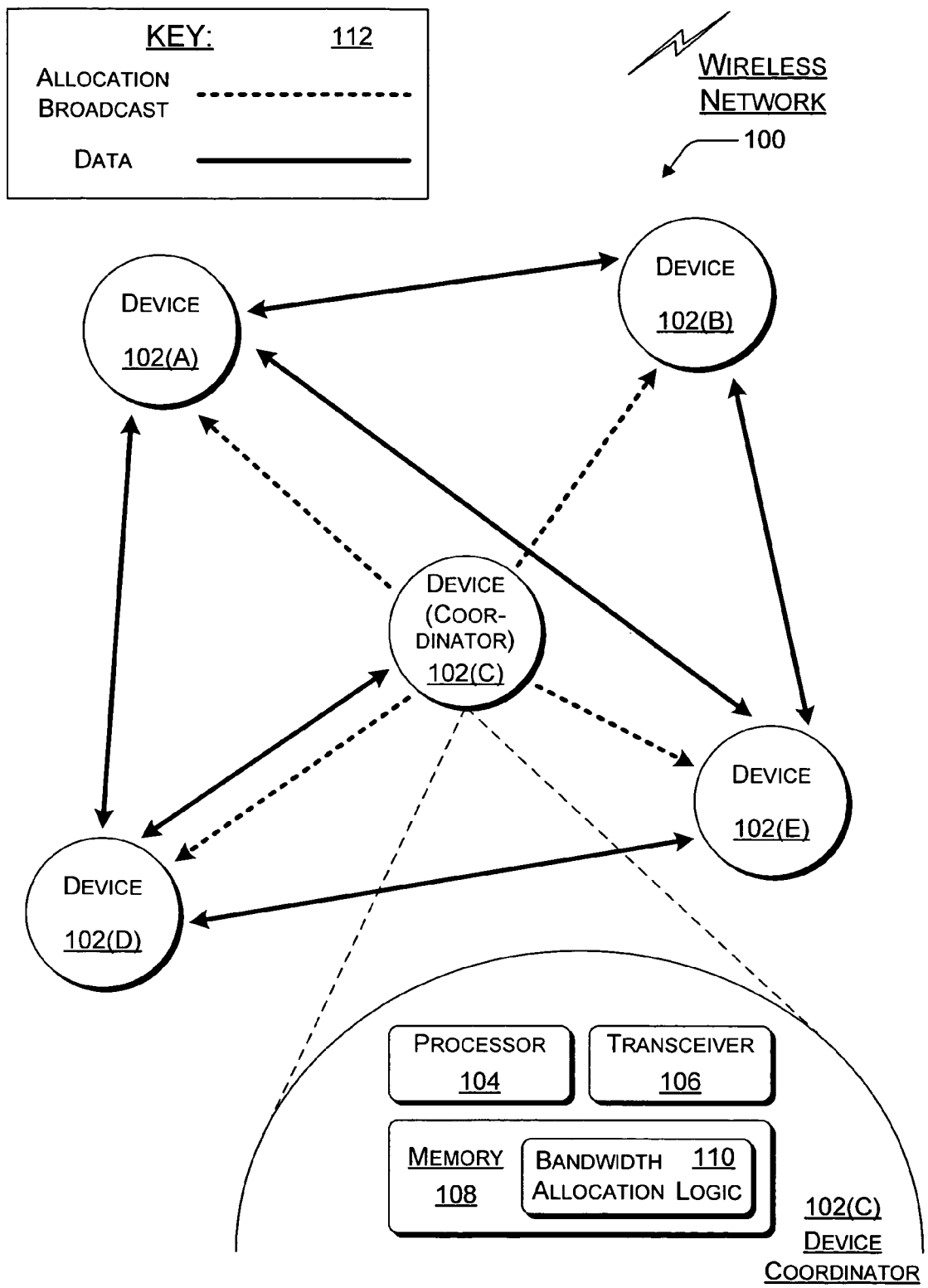
FIG. 1 illustrates an exemplary wireless network formed from multiple general devices and a device coordinator.

FIG. 1 illustrates an exemplary wireless network 100 formed from multiple general devices 102(A,B,D,E) and a device coordinator 102(C). Wireless network 100 includes five devices 102 that are capable of wireless communication; however, a different number of devices 102 may alternatively form wireless network 100. As indicated by a key 112, data communications are represented by solid lines, and allocation broadcast communications are represented by dashed lines.

In a described implementation, each device 102 is capable of forming and/or participating in an ad hoc wireless network. Each device 102 may be a laptop computer, a mobile phone, a personal digital assistant (PDA), an input device, and so forth. Other exemplary realizations for devices 102 are described further below with reference to FIG. 8.

Each device 102 may be similar to or different from each other device 102 in terms of size/shape, intended purpose, processing ability, programming, and so forth. Regardless, one device 102 is established as the device coordinator 102 (C). For example, the most powerful device 102 may be selected as the device coordinator 102(C). Among other possible coordination functions, the device coordinator is capable of allocating bandwidth among the general devices 102 for wireless communications within wireless network 100.

As illustrated, device 102(C) is the designated device coordinator 102(C), and devices 102(A,B,D,E) are general devices 102(A,B,D,E). Device coordinator 102(C) is shown sending an allocation broadcast (dashed lines) to general devices 102(A,B,D,E). Device 102(A) is shown transmitting/exchanging data with devices 102(B), 102(D), and 102(E). Device 102(B) is shown also transmitting/exchanging data with device 102(E), and device 102(D) is shown also transmitting/exchanging data with device coordinator 102(C) and device 102(E).

Each device 102, such as device coordinator 102(C), includes a processor 104, a transceiver 106, and a memory 108. A transmitter and/or receiver (i.e., a transceiver) 106 is capable of sending/transmitting wireless communications from and receiving wireless communications at device coordinator 102(C). Memory 108 includes processor-executable instructions that are executable by processor 104 to effectuate particular device 102 functions. At least for coordinating devices 102 such as device coordinator 102(C), memory 108 includes bandwidth allocation logic 110, which may comprise processor-executable instructions. More generally, bandwidth allocation logic 110 may comprise hardware, software, firmware, or analog component(s), some combination thereof, and so forth. Additional exemplary components, aspects, etc. for devices 102 are described further below with reference to FIG. 8.

By way of example only, wireless network 100 may be realized as a piconet operating in accordance with a WPAN of an IEEE 802.15.3 standard. As such, each device 102 may be realized as a basic component of a piconet, which is termed a device (DEV). Thus, device coordinator 102(C) may be realized as a piconet coordinator (PNC) that performs the central controlling functionalities of the piconet.

Figure 2:
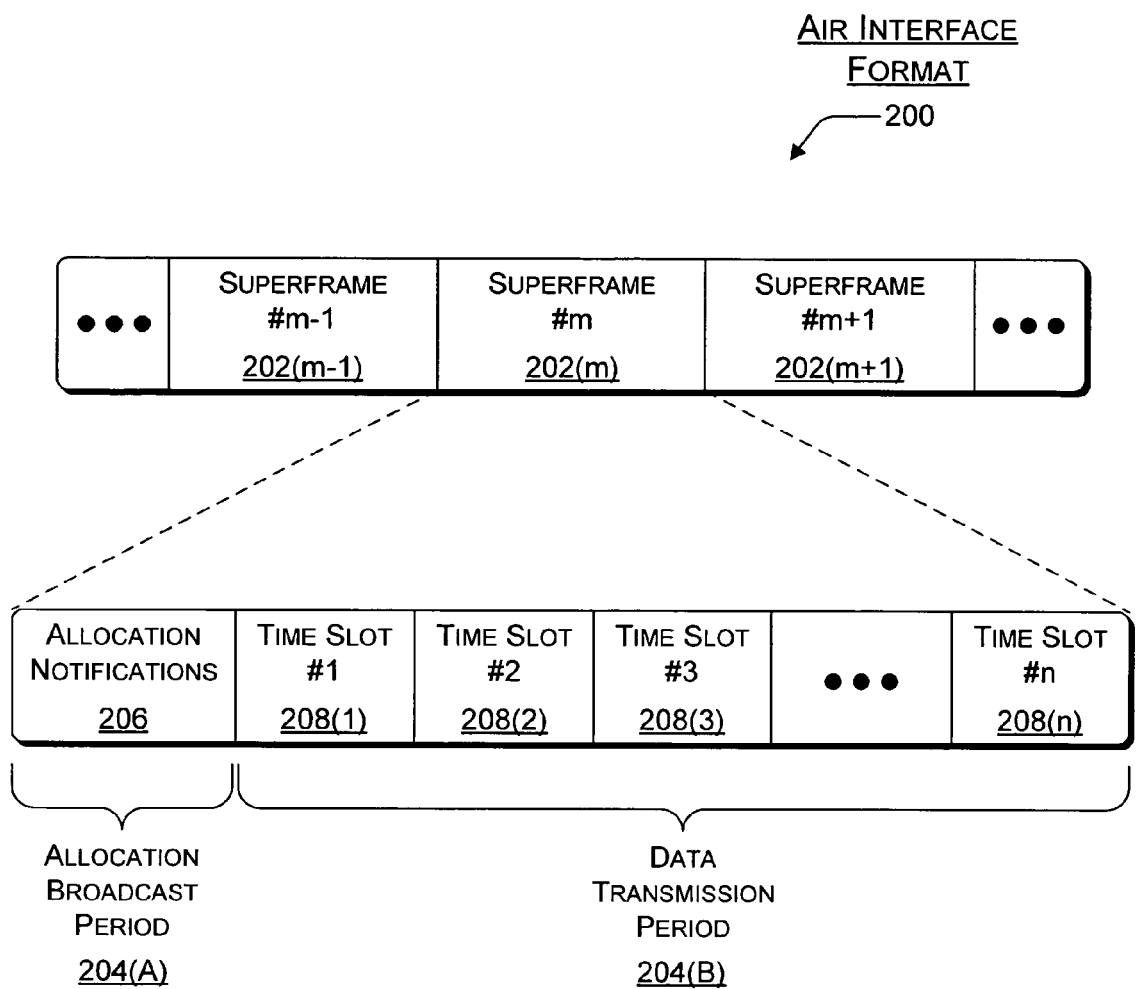
FIG. 2 is an exemplary air interface format that illustrates a superframe for the wireless network of FIG. 1.

FIG. 2 is an exemplary air interface format 200 that illustrates a superframe 202 for wireless network 100. Three superframes 202(m−1), 202(m), and 202(m+1) are explicitly shown. Each superframe 202 is divided into at least two periods 204. These two periods include an allocation broadcast period 204(A) and a data transmission period 204(B). Data transmission period 204(B) is further divided into multiple time slots 208 for a network dividing the available limited bandwidth by time.

Hence, in a described implementation, air interface format 200 adheres to a time division multiple access (TDMA) technology at the medium access control (MAC) layer in order to share the available bandwidth. As shown for superframe #m 202(m) in particular, each superframe 202 includes allocation notifications 206 of allocation broadcast period 204(A) followed by time slots 208(1), 208(2), 208(3) . . . 208(n) of data transmission period 204(B). Although not explicitly shown, each superframe 202 may also include other periods 204 and portions thereof.

In operation of wireless network 100 (of FIG. 1), device coordinator 102(C) uses the allocation notifications 206 portion of allocation broadcast period 204(A) to inform each of the general devices 102(A,B,D,E) of a respective time slot 208 that has been allocated to each of their respective streams (not shown in FIG. 2). Each respective general device 102(A,B,D,E) thereafter uses its respective allocated time slot(s) 208 for each respective stream to transmit data to another device 102.

The total available time duration or temporal bandwidth that can be assigned into time slots 208 is data transmission period 204(B). Each time slot 208 may be of a different length as determined by device coordinator 102(C). Consequently, the position and duration of each time slot 208 is communicated with allocation notifications 206. For example, one or more tags indicating the length and locations of time slots 208 may be added to a MAC header.

By way of example only for an IEEE 802.15.3 implementation, allocation notifications 206 of allocation broadcast period 204(A) may be realized as a beacon that is transmitted by the PNC. Data transmission period 204(B) may be realized as the channel time allocation period (CTAP) in the structure of a superframe as defined in IEEE 802.15.3. Similarly, time slots 208 may be realized as CTAs. Between allocation broadcast period 204(A) and data transmission period 204(B), a superframe may also include the optional contention access period based on carrier sense multiple access with collision avoidance (CSMA/CA) as defined in IEEE 802.15.3.

Figure 3:
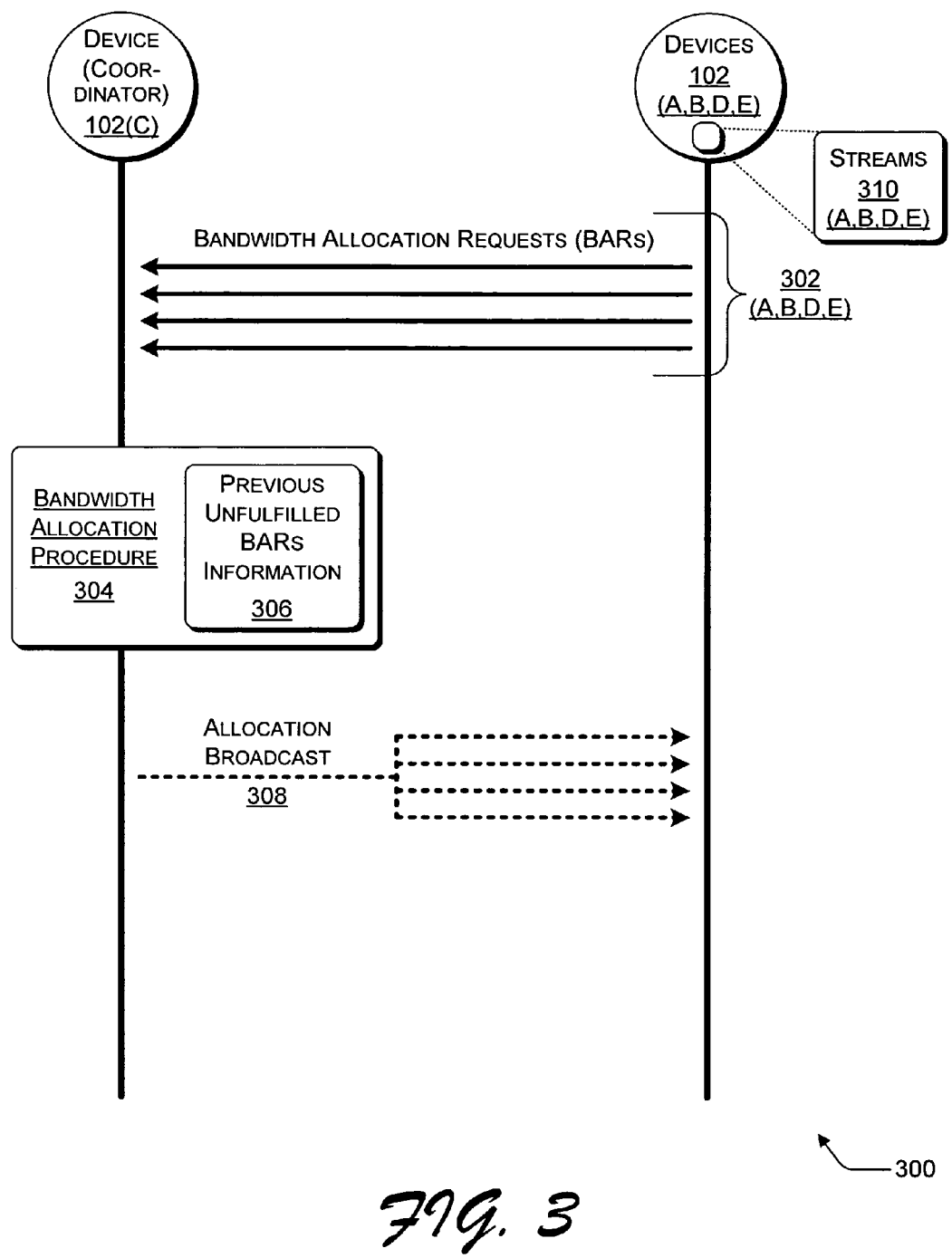
FIG. 3 is an exemplary sequence diagram illustrating bandwidth allocation by the device coordinator for the multiple general devices.

FIG. 3 is an exemplary sequence diagram 300 illustrating bandwidth allocation by device coordinator 102(C) for streams 310(A,B,D,E) of general devices 102(A,B,D,E). Each respective general device 102(A,B,D,E) sends a respective bandwidth allocation request (BAR) 302(A,B,D,E) to device coordinator 102(C) on behalf of each respective stream 310(A,B,D,E). For clarity of explanation in the following description, each device 102 is assumed to have one stream 310. However, one or more devices 102 may support more than one stream 310. For cases with multiple streams 310 for one or more devices 102, bandwidth allocation as described herein may be applied to each stream 310 accordingly, regardless of the number of streams 310 per device 102.

Thus, each respective general device 102(A,B,D,E) sends a respective bandwidth allocation request (BAR) 302(A,B,D,E) to device coordinator 102(C) for their respective streams (e.g., data streams such as video streams). Device coordinator 102(C) performs a bandwidth allocation procedure 304 to allocate bandwidth responsive to bandwidth allocation requests 302(A,B,D,E). After bandwidth allocation procedure 304, device coordinator 102(C) sends allocation broadcast 308 for each stream 310(A,B,D,E) to general devices 102(A,B,D,E).

In a described implementation, each bandwidth allocation request 302 stipulates a requested bandwidth amount. The bandwidth amount may be, for example, a number of time unit(s), a number of frequency or frequencies (e.g., in a frequency division multiple access (FDMA) system), a number of code(s) (e.g., in a code division multiple access (CDMA) system), some combination thereof, and so forth. Similarly, each superframe 202 may be a grouping of bandwidth amounts generally, such as a grouping of frequencies, codes, etc.

Device coordinator 102(C) has access to (e.g., has previously stored) information 306 related to previous unfulfilled BARs 306. Previous unfulfilled BARs information 306 includes the unserviced bandwidth portion of a previous requested bandwidth amount.

Bandwidth allocation procedure 304 is performed by device coordinator 102(C) based on previous unfulfilled BARs information 306 and responsive to bandwidth allocation requests 302(A,B,D,E). In a sense, bandwidth allocation procedure 304 is therefore able to effectuate an inferred deadline-aware scheduling (DAS) algorithm inasmuch as an unserviced bandwidth amount from a previous bandwidth allocation request 302 is more likely to be at or near a deadline as compared to a newly-arrived bandwidth amount that is requested. Respective allocated bandwidth amounts resulting from bandwidth allocation procedure 304 are sent to respective general devices 102(A,B,D,E) from device coordinator 102(C) with allocation broadcast 308.

Figure 4:
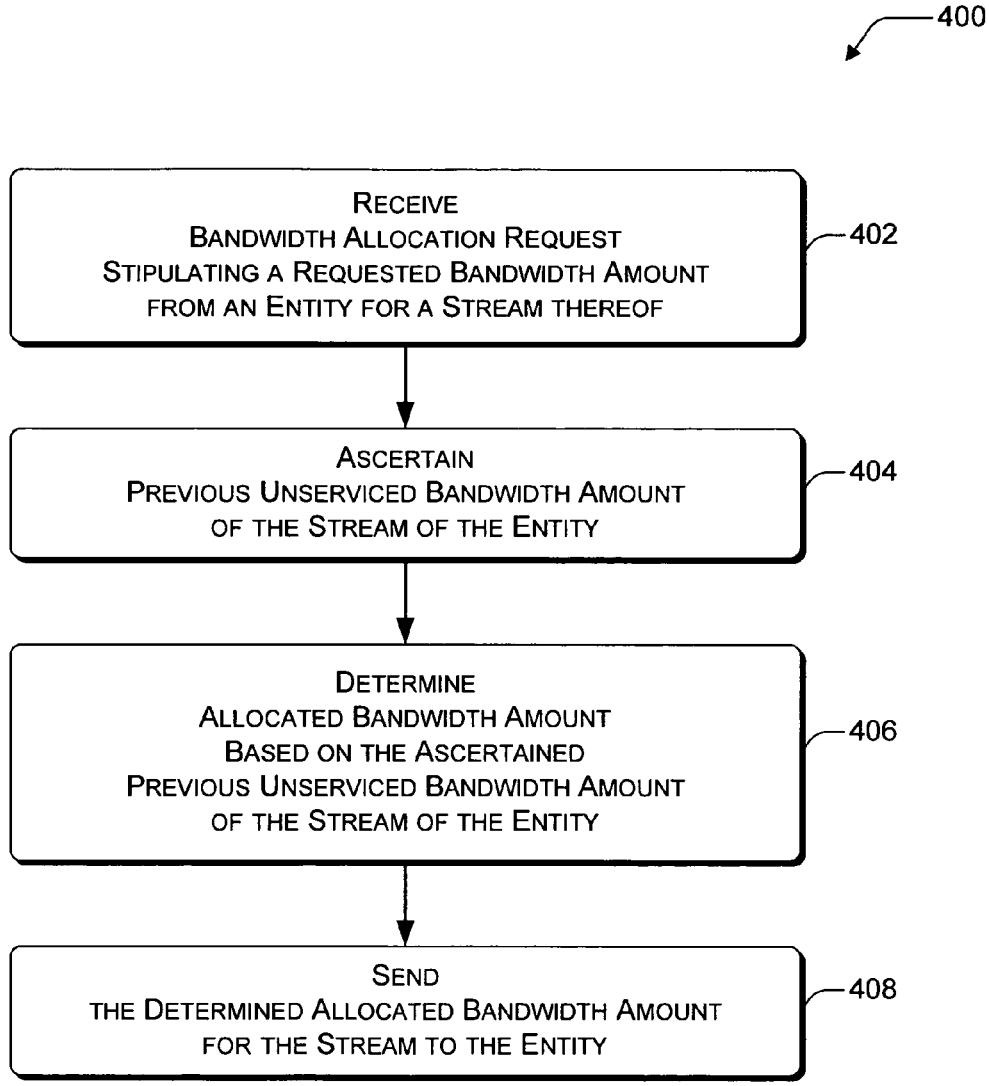
FIG. 4 is a flow diagram that illustrates an exemplary method for bandwidth allocation in the wireless network.

FIG. 4 is a flow diagram 400 that illustrates an exemplary method for bandwidth allocation in wireless network 100. Flow diagram 400 includes four (4) blocks 402-408. Although the actions of blocks 402-408 may be performed in other implementations and environments, FIGS. 1-3 are used in particular to illuminate certain aspects of the method. For example, the actions of flow diagram 400 may be performed by a device coordinator 102(C).

At block 402, a bandwidth allocation request stipulating a requested bandwidth amount is received from an entity for a stream thereof. For example, a bandwidth allocation request 302(A) that stipulates a requested bandwidth amount for a current superframe 202(m) may be received from device 102(A) for a stream 310(A) at device coordinator 102(C). Generally, an entity may be a device, a user, some combination thereof, and so forth.

At block 404, a previous unserviced bandwidth amount of the stream of the entity is ascertained. For example, device coordinator 102(C) may retrieve from memory 108 a stored unserviced bandwidth amount for stream 310(A) of device 102(A) from previous superframe 202 (e.g., the immediately previous superframe 202(m−1)).

At block 406, an allocated bandwidth amount for the stream of the entity is determined based on the ascertained previous unserviced bandwidth amount of the stream of the entity. For example, a bandwidth amount allocated to stream 310(A) of device 102(A) for current superframe 202(m) may be determined by device coordinator 102(C) based on the ascertained previous unserviced bandwidth amount of previous superframe 202(m−1) of stream 310(A) of device 102(A) and responsive to bandwidth allocation request 302(A).

At block 408, the determined allocated bandwidth amount for the stream is sent to the entity. For example, the determined allocated bandwidth amount for current superframe 202(m) is sent to device 102(A) from device coordinator 102(C) (e.g., with a reference to stream 310(A)) as a part of allocation notifications 206 of allocation broadcast period 204(A) as at least a portion of allocation broadcast 308.

In a described implementation and with reference to FIGS. 1-4, each current bandwidth allocation request 302 of a current superframe 202(m) stipulates a current requested bandwidth amount that includes a previous unserviced bandwidth amount from a previous superframe 202(m−1). The previous unserviced bandwidth amount can be calculated by device coordinator 102(C) as indicated by equation (1):

$$\text{Unserviced}(m-1) = \text{Requested}(m-1) - \text{Allocated}(m-1), \quad (1)$$

where the allocated bandwidth amount from the previous superframe 202(m−1) is the bandwidth amount that the requesting general stream 310 of general device 102 was assigned by device coordinator 102(C) in that previous superframe 202(m−1). The previous unserviced bandwidth amount is stored by device coordinator 102(C) or otherwise retained thereby for subsequent access thereto.

In a current superframe 202(m), the current requested bandwidth amount includes a newly-arrived bandwidth amount as well as the previous unserviced bandwidth amount. Because device coordinator 102(C) has access to the previous unserviced bandwidth amount, device coordinator 102(C) can compute the newly-arrived bandwidth amount as follows in equation (2):

$$\text{NewlyArrived}(m) = \text{Requested}(m) - \text{Unserviced}(m-1). \quad (2)$$

A respective reserved bandwidth amount that is assigned to each respective stream 310 of the general device 102 in each superframe 202(m) may be computed as indicated by equation (3):

$$\text{Reserved}(m) = \alpha \times \text{Reserved}(m-1) + (1-\alpha) \times \text{NewlyArrived}(m). \quad (3)$$

In equation (3), α is a smoothing factor that can be used to modulate (e.g., retard) how quickly the reserved bandwidth amount changes from one superframe 202 to another. Although any suitable value for α may be used, an exemplary range of values for α is 0.7 to 0.9.

Figure 5:
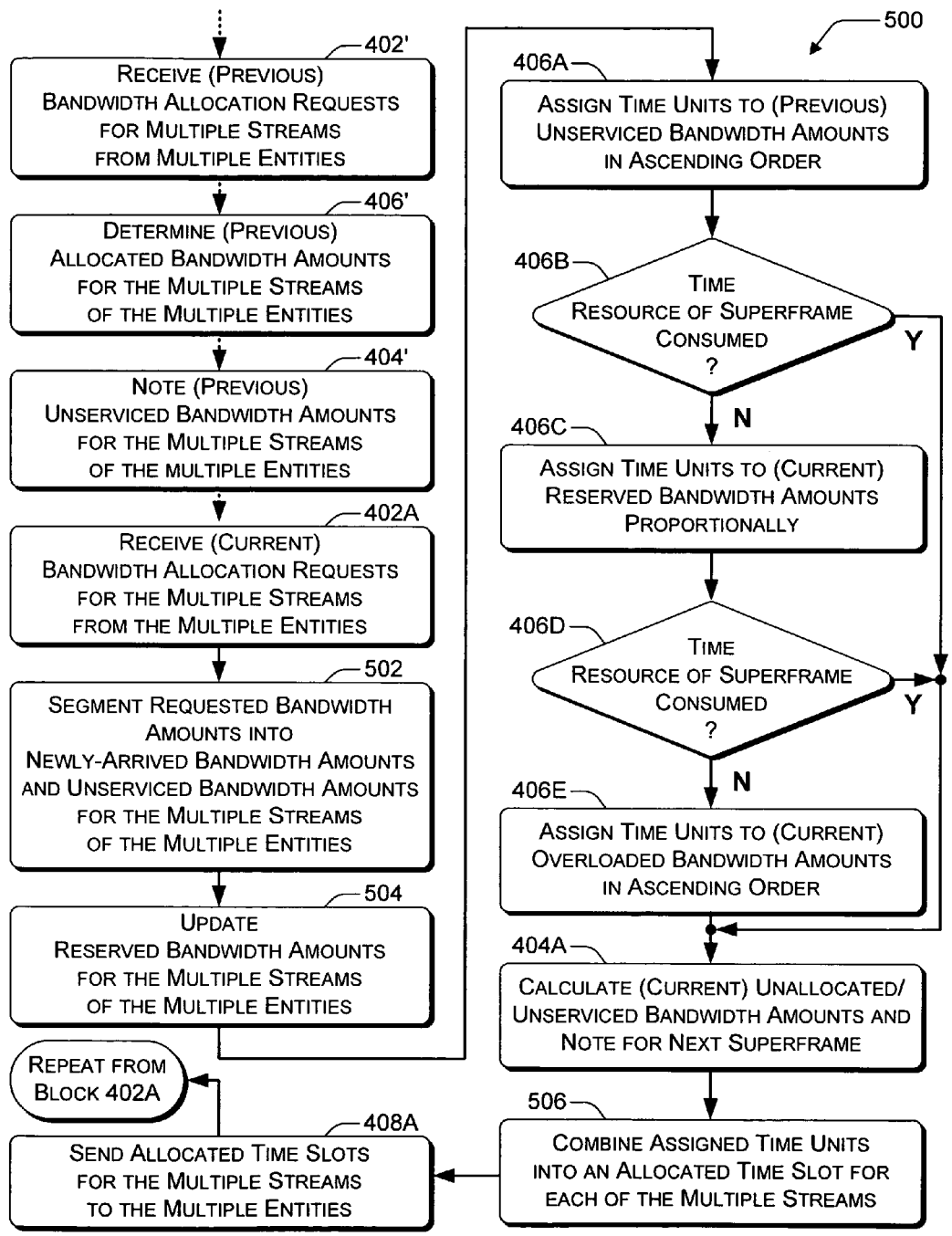
FIG. 5 is a flow diagram that illustrates another exemplary method for bandwidth allocation in the wireless network.

FIG. 5 is a flow diagram 500 that illustrates another exemplary method for bandwidth allocation in wireless network 100. Flow diagram 500 includes fourteen (14) blocks. Although the actions of the blocks of flow diagram 500 may be performed in other implementations and environments, FIGS. 1-4 are used in particular to illuminate certain aspects of the method. For example, the actions of flow diagram 500 may be performed by a device coordinator 102(C). Additionally, the blocks designated with numerals in the 400s relate to corresponding blocks of FIG. 4.

In a described implementation, the actions of three (3) blocks 402', 406', and 404' relate to a previous superframe 202(m−1) as indicated by the prime mark. At block 402', (previous) bandwidth allocation requests from multiple entities on behalf of multiple streams thereof are received. At block 406', (previous) allocated bandwidth amounts for the multiple streams of the multiple entities are determined. At block 404', (previous) unserviced bandwidth amounts for the multiple streams of the multiple entities are noted.

These unserviced bandwidth amounts of the multiple streams from the previous superframe 202(m−1) are considered when determining (i.e., are factored into a determination of) allocated bandwidth amounts for the multiple streams for the next superframe 202(m). The actions of eleven (11) blocks 402A, 502, 504, 406A-406E, 404A, 506, and 408A relate to a current superframe 202(m). The block numerals of FIG. 5 in the 400s that have an alphabetical character appended thereto (e.g., 402A, 406C, 408A, etc.) indicate a more-specific and/or alternative implementation of the corresponding block in FIG. 4 for the current superframe 202(m).

At block 402A, (current) bandwidth allocation requests for the multiple streams are received from the multiple entities. For example, bandwidth allocation requests 302 may be received at device coordinator 102(C) with each such respective bandwidth allocation request 302 stipulating a respective requested bandwidth amount.

At block 502, requested bandwidth amounts are segmented into newly-arrived bandwidth amounts and unserviced bandwidth amounts for the multiple streams of the multiple entities. For example, equation (2) above may be used to compute the newly-arrived bandwidth amounts for the current superframe 202(m) from the requested bandwidth amounts as received at block 402A and the unserviced bandwidth amounts of the previous superframe 202(m−1) as noted at block 404'.

At block 504, reserved bandwidth amounts are updated for the multiple streams of the multiple entities. For example, reserved bandwidth amounts for the current superframe 202(m) may be computed in accordance with equation (3) above using the reserved bandwidth amount for the previous superframe 202(m−1) and the computed newly-arrived bandwidth amounts for the current superframe 202(m) that are produced at block 502, as well as possibly a smoothing factor.

The actions of five (5) blocks 406A-406E relate to determining allocated bandwidth amounts for the multiple streams of the multiple entities. In this example, the bandwidth units comprise time units. At block 406A, time units are assigned to (previous) unserviced bandwidth amounts in ascending order. For example, time units of the available bandwidth of data transmission period 204(B) of the current superframe 202(m) may be assigned to unserviced bandwidth amounts of the previous superframe 202(m−1) for the multiple streams of the multiple entities starting with the lowest-valued unserviced bandwidth amount and proceeding to the highest-valued unserviced bandwidth amount.

At block 406B, it is detected if the time resource of the superframe is consumed. For example, it may be detected whether all available time units of data transmission period 204(B) of the current superframe 202(m) have been assigned. If so, the method of flow diagram 500 continues at block 404A. If not, the method continues at block 406C.

At block 406C, time units are assigned to (current) reserved bandwidth amounts proportionally. For example, additional available time units of data transmission period 204(B) of the current superframe 202(m) may be assigned to the reserved bandwidth amounts as computed at block 504 for the multiple streams of the multiple entities on a proportional relative basis.

At block 406D, it is detected if the time resource of the superframe is consumed. For example, it may be detected whether all available time units of data transmission period 204(B) of the current superframe 202(m) have been exhausted by assignment. If so, the method of flow diagram 500 continues at block 404A. If not, the method continues at block 406E.

At block 406E, time units are assigned to (current) overloaded bandwidth amounts in ascending order. For example, remaining available time units of data transmission period 204(B) of the current superframe 202(m) may be assigned to overloaded bandwidth amounts for the multiple streams of the multiple entities starting with the lowest-valued overloaded bandwidth amount and proceeding to the highest-valued overloaded bandwidth amount.

Each overloaded bandwidth amount is the as-of-yet unfulfilled portion of the corresponding newly-arrived bandwidth amount. Hence, each overloaded bandwidth amount may be computed by or derived as a result of deducting the corresponding reserved bandwidth amount from the corresponding newly-arrived bandwidth amount. Overloaded bandwidth amounts are addressed further below with reference to FIGS. 6 and 7.

At block 404A, the (current) unallocated/unserviced bandwidth amounts are calculated and noted for use in the next superframe. For example, portions of newly-arrived bandwidth amounts to which no time units are assigned in the current superframe 202(m) are unallocated/unserviced bandwidth amounts. More specifically, unserviced bandwidth amounts can be calculated using equation (1) above by subtracting the total allocated bandwidth amounts from corresponding requested bandwidth amounts for the current superframe 202(m). These unserviced bandwidth amounts may be stored for consideration in the next superframe 202(m+1).

At block 506, the assigned time units are combined into an allocated time slot for each stream of the multiple streams. For example, the time units for each respective stream of the multiple streams that are assigned to the respective stream by the actions of each of blocks 406A, 406C, and 406E may be summed to form an allocated time slot 208 for each respective stream of the multiple streams of the multiple entities.

At block 408A, allocated time slots for the multiple streams are sent to the multiple entities. For example, information indicating position and duration of the allocated time slots 208(1, 2 . . . n) for respective streams of the multiple streams may be transmitted to respective entities of the multiple entities as allocation notifications 206 of an allocation broadcast period 204(A) of the current superframe 202(m) (e.g., as an allocation broadcast 308). Thereafter, the method of flow diagram 500 is repeated from block 402A.

Figure 6:
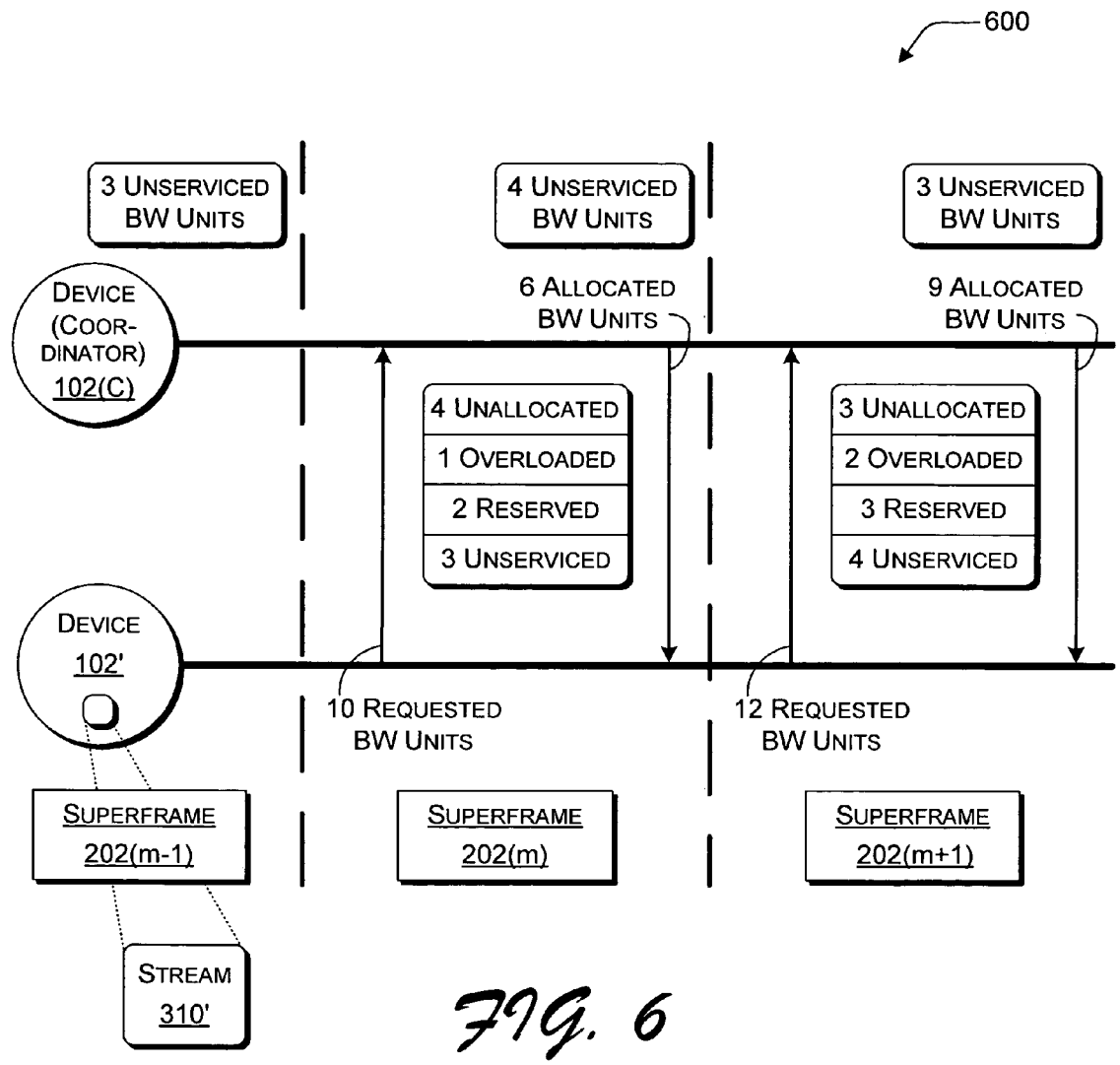
FIG. 6 is an exemplary bandwidth allocation for one general device over two superframes.

FIG. 6 is an exemplary bandwidth allocation 600 for one stream 310 of one general device 102 over two superframes 202. Specifically, bandwidth allocation 600 implements part of the method of flow diagram 500 (of FIG. 5) for a single stream 310' of a single general device 102' over (primarily) two superframes 202(m) and 202(m+1) in which the time units are generalized to bandwidth units. Bandwidth allocation is performed for stream 310' of general device 102' by device coordinator 102(C) in a wireless network 100. Although not explicitly shown in bandwidth allocation 600, device coordinator 102(C) may also be allocating available bandwidth to other streams 310 of other general devices 102.

In a previous superframe 202(m−1), device coordinator 102(C) has retained or noted that 3 unserviced bandwidth (BW) units are associated with stream 310' of device 102' for consideration in the next superframe 202(m). In superframe 202(m) for this example, device 102' sends a bandwidth allocation request that stipulates 10 requested bandwidth units on behalf of stream 310' to device coordinator 102(C).

First (e.g., corresponding to block 406A of FIG. 5), 3 bandwidth units are assigned to the 3 unserviced bandwidth units from superframe 202(m−1). Second (e.g., corresponding to block 406C), 2 bandwidth units are then assigned to the reserved bandwidth amount, which is given as 2 bandwidth units for superframe 202(m) in this example. Third (e.g., corresponding to block 406E), 1 bandwidth unit is assigned toward the overloaded bandwidth amount, which totals 5 bandwidth units in this superframe (i.e., 10 requested bandwidth units—5 bandwidth units assigned thusfar).

After assignment of bandwidth units to the overloaded bandwidth amount, 6 total bandwidth units are allocated to stream 310' of device 102' in superframe 202(m). Consequently, device coordinator 102(C) transmits an allocation broadcast that notifies device 102' of the 6 allocated bandwidth units for stream 310'. Hence, of the 10 requested bandwidth units, 4 bandwidth units are still unallocated. There are therefore 4 unserviced bandwidth units resulting from superframe 202(m) and retained in association with stream 310' of device 102' for consideration in the next superframe 202(m+1).

In superframe 202(m+1), device 102' sends a bandwidth allocation request that stipulates 12 requested bandwidth units on behalf of stream 310' to device coordinator 102(C). First, 4 bandwidth units are assigned to the 4 unserviced bandwidth units from superframe 202(m). Second, 3 bandwidth units are then assigned to the reserved bandwidth amount, which is 3 bandwidth units as updated for superframe 202(m+1) in this example. Third, 2 bandwidth units are assigned toward the overloaded bandwidth amount, which totals 5 bandwidth units in this superframe (i.e., 12 requested bandwidth units—7 bandwidth units assigned thusfar).

After assignment of bandwidth units to the overloaded bandwidth amount, 9 total bandwidth units are allocated to stream 310' of device 102' in superframe 202(m+1). Consequently, device coordinator 102(C) transmits an allocation broadcast that notifies device 102' of the 9 allocated bandwidth units for stream 310'. Hence, of the 12 requested bandwidth units, 3 bandwidth units are still unallocated. There are therefore 3 unserviced bandwidth units resulting from superframe 202(m+1) and retained in association with stream 310' of device 102' for consideration in the next superframe 202 (m+2) (not specifically shown).

Figure 7:
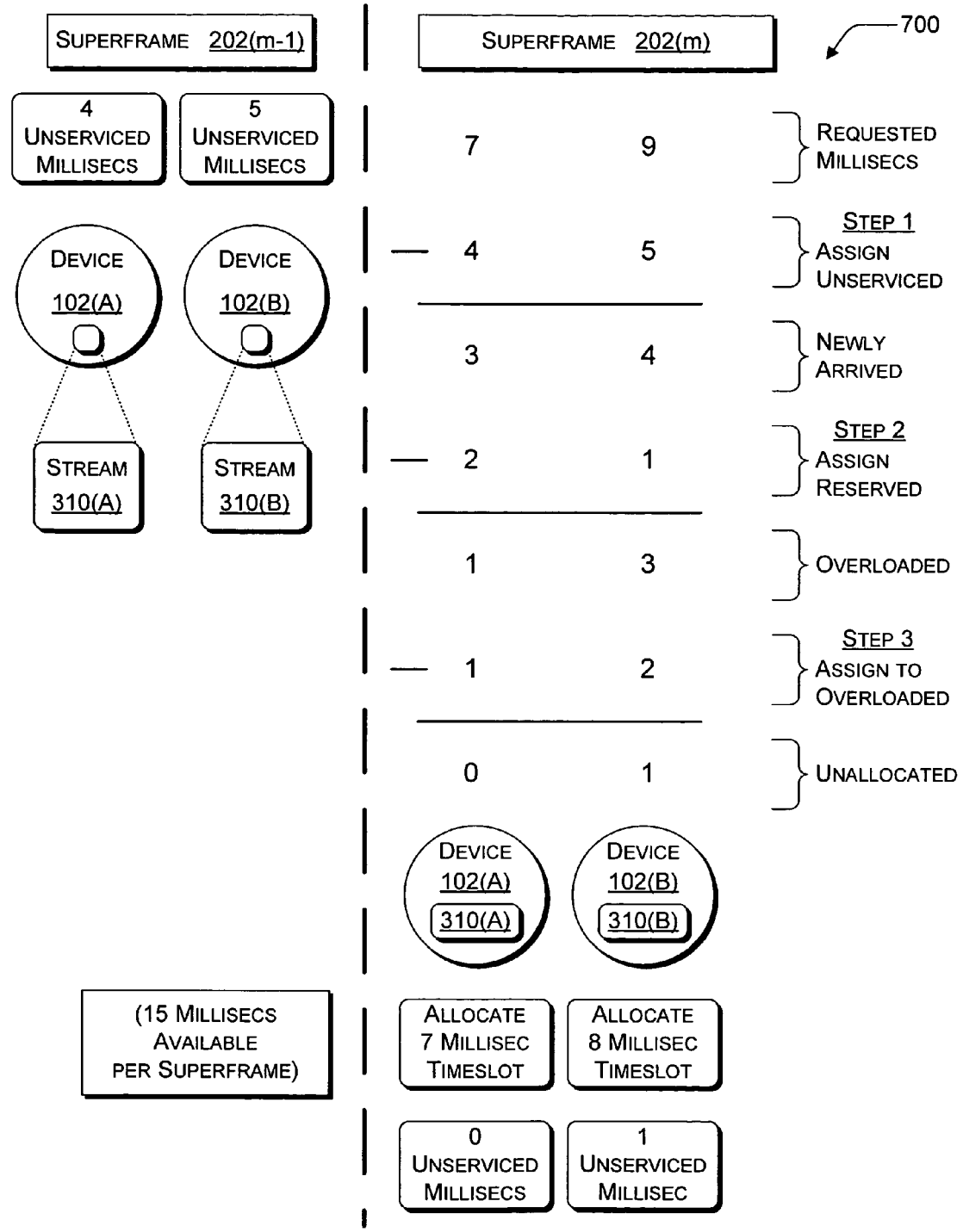
FIG. 7 is an exemplary bandwidth allocation for two general devices over one superframe.

FIG. 7 is an exemplary bandwidth allocation 700 for two streams 310 of two general devices 102 over one superframe 202. Specifically, bandwidth allocation 700 implements part of the method of flow diagram 500 (of FIG. 5) for two streams 310(A) and 310(B) of two general devices 102(A) and 102 (B), respectively, over (primarily) one superframe 202(m) in which generic bandwidth units are implemented as time units that are set to an exemplary millisecond level. In this exemplary described implementation, data transmission period 204(B) of each superframe 202 is 15 milliseconds, and each general device 102 includes only one stream 310.

Bandwidth allocation may be performed for streams 310 (A) and 310(B) of general devices 102(A) and 102(B) by a device coordinator 102(C) (not specifically shown in FIG. 7) in a wireless network 100. Although not explicitly shown in FIG. 7, more than two streams 310(A) and 310(B) (as well as fewer than or more than two general devices 102(A) and 102(B)) may be involved in bandwidth allocation 700.

From a previous superframe 202(m−1), device coordinator 102(C) has retained or noted the number of unserviced milliseconds for each of stream 310(A) and stream 310(B) of device 102(A) and device 102(B), respectively. Specifically, stream 310(A) of device 102(A) has 4 unserviced milliseconds, and stream 310(B) of device 102(B) has 5 unserviced milliseconds. In subsequent superframe 202(m), device 102(A) requests 7 milliseconds on behalf of stream 310(A), and device 102(B) requests 9 milliseconds on behalf of stream 310(B).

In Step 1, available milliseconds are assigned to the unserviced milliseconds in ascending order. Hence, 4 milliseconds are assigned to stream 310(A) of device 102(A), and then 5 milliseconds are assigned to stream 310(B) of device 102(B). The difference between the requested milliseconds and the unserviced milliseconds is computed to derive the newly-arrived milliseconds portion of the requested milliseconds.

In Step 2, reserved milliseconds are assigned in a proportional fashion from the remaining available milliseconds. In this example, 2 reserved milliseconds are associated with stream 310(A) of device 102(A), and 1 reserved millisecond is associated with stream 310(B) of device 102(B). The difference between the newly-arrived milliseconds and the reserved milliseconds is computed to derive the still unfulfilled overloaded milliseconds. Thus, stream 310(A) of device 102(A) has 1 overloaded millisecond, and stream 310(B) of device 102(B) has 3 overloaded milliseconds.

In Step 3, any available milliseconds that remain unallocated are assigned to the overloaded milliseconds. From Step 1 and Step 2, 4+5+2+1=12 milliseconds have been assigned for unserviced and reserved milliseconds. The 3 (i.e., 15-12) remaining available milliseconds are assigned to the unfulfilled overloaded milliseconds in ascending order. Hence, 1 millisecond is assigned to stream 310(A) of device 102(A) to completely fulfill its total 7 requested milliseconds. The final 2 remaining available milliseconds are then assigned to stream 310(B) of device 102(B). Stream 310(A) of device 102(A) therefore has 0 unallocated milliseconds, and stream 310(B) of device 102(B) has 1 unallocated millisecond.

The combined sum of assigned milliseconds for stream 310(A) of device 102(A) is 4+2+1=7 milliseconds. Stream 310(A) of device 102(A) is thus allocated a 7 millisecond timeslot by device coordinator 102(C). The combined sum of assigned milliseconds for stream 310(B) of device 102(B) is 5+1+2=8 milliseconds. Stream 310(B) of device 102(B) is thus allocated an 8 millisecond timeslot by device coordinator 102(C). For superframe 202(m), device coordinator 102(C) therefore notes stream 310(A) of device 102(A) as having 0 unserviced milliseconds and stream 310(B) of device 102(B) as having 1 unserviced millisecond.

The devices, actions, aspects, features, components, etc. of FIGS. 1-7 are illustrated in diagrams that are divided into multiple blocks. However, the order, interconnections, interrelationships, layout, etc. in which FIGS. 1-7 are described and/or shown is not intended to be construed as a limitation, and any number of the blocks can be modified, combined, rearranged, augmented, omitted, etc. in any manner to implement one or more systems, methods, devices, procedures, media, apparatuses, arrangements, etc. for bandwidth allocation implementations. Furthermore, although the description herein includes references to specific implementations (and the exemplary operating environment/device of FIG. 8 below), the illustrated and/or described implementations can be implemented in any suitable hardware, software, firmware, or combination thereof and using any suitable device architecture(s), wireless network protocol(s), bandwidth division scheme(s), wireless air interface(s), and so forth.

Figure 8:
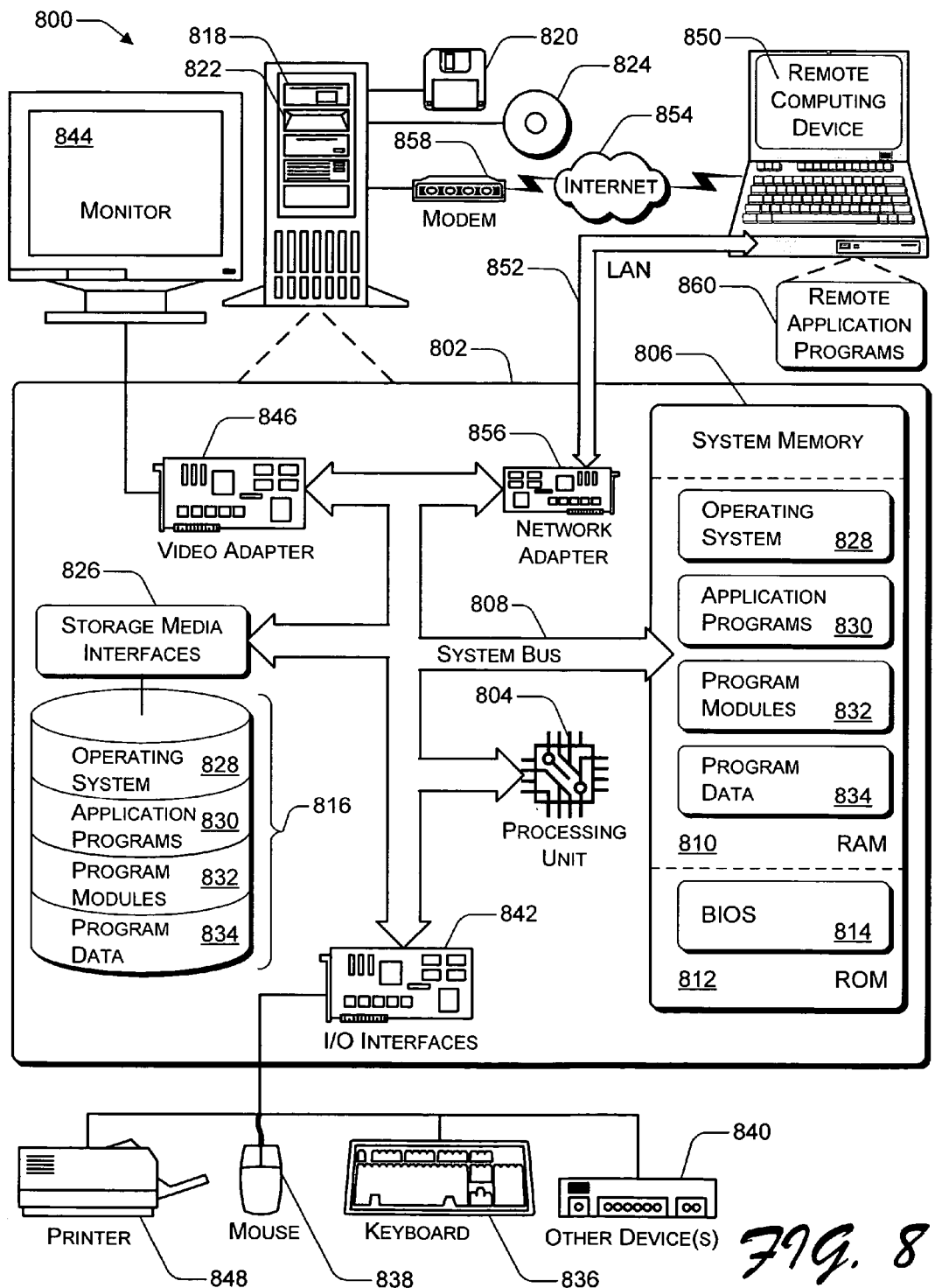
FIG. 8 illustrates an exemplary computing (or general device) operating environment that is capable of (wholly or partially) implementing at least one aspect of bandwidth allocation as described herein.

FIG. 8 illustrates an exemplary computing (or general device) operating environment 800 that is capable of (fully or partially) implementing at least one system, device, apparatus, component, arrangement, approach, method, procedure, media, some combination thereof, etc. for bandwidth allocation implementations as described herein. Operating environment 800 may be utilized in the computer and network architectures described below.

Exemplary operating environment 800 is only one example of an environment and is not intended to suggest any limitation as to the scope of use or functionality of the applicable device (including computer, network node, entertainment device, mobile appliance, general electronic device, etc.) architectures. Neither should operating environment 800 (or the devices thereof) be interpreted as having any dependency or requirement relating to any one or to any combination of components as illustrated in FIG. 8.

Additionally, bandwidth allocation implementations may be realized with numerous other general purpose or special purpose device (including computing or wireless system) environments or configurations. Examples of well known devices, systems, environments, and/or configurations that may be suitable for use include, but are not limited to, personal computers, server computers, thin clients, thick clients, personal digital assistants (PDAs) or mobile telephones, watches, hand-held or laptop devices, multiprocessor systems, microprocessor-based systems, set-top boxes, programmable consumer electronics, video game machines, game consoles, portable or handheld gaming units, network PCs, minicomputers, mainframe computers, wired or wireless network nodes (including general or specialized routers), distributed or multi-processing computing environments that include any of the above systems or devices, some combination thereof, and so forth.

Realizations for bandwidth allocation implementations may be described in the general context of processor-executable instructions. Generally, processor-executable instructions include routines, programs, modules, protocols, objects, interfaces, components, data structures, etc. that perform and/or enable particular tasks and/or implement particular abstract data types. Bandwidth allocation implementations, as described in certain embodiments herein, may also be practiced in distributed processing environments where tasks are performed by remotely-linked processing devices that are connected through a communications link and/or network. Especially but not exclusively in a distributed computing environment, processor-executable instructions may be located in separate storage media, executed by different processors, and/or propagated over transmission media.

Exemplary operating environment 800 includes a general-purpose computing device in the form of a computer 802, which may comprise any (e.g., electronic) device with computing/processing capabilities. The components of computer 802 may include, but are not limited to, one or more processors or processing units 804, a system memory 806, and a system bus 808 that couples various system components including processor 804 to system memory 806.

Processors 804 are not limited by the materials from which they are formed or the processing mechanisms employed therein. For example, processors 804 may be comprised of semiconductor(s) and/or transistors (e.g., electronic integrated circuits (ICs)). In such a context, processor-executable instructions may be electronically-executable instructions. Alternatively, the mechanisms of or for processors 804, and thus of or for computer 802, may include, but are not limited to, quantum computing, optical computing, mechanical computing (e.g., using nanotechnology), and so forth.

System bus 808 represents one or more of any of many types of wired or wireless bus structures, including a memory bus or memory controller, a point-to-point connection, a switching fabric, a peripheral bus, an accelerated graphics port, and a processor or local bus using any of a variety of bus architectures. By way of example, such architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, some combination thereof, and so forth.

Computer 802 typically includes a variety of processor-accessible media. Such media may be any available media that is accessible by computer 802 or another (e.g., electronic) device, and it includes both volatile and non-volatile media, removable and non-removable media, and storage and transmission media.

System memory 806 includes processor-accessible storage media in the form of volatile memory, such as random access memory (RAM) 840, and/or non-volatile memory, such as read only memory (ROM) 812. A basic input/output system (BIOS) 814, containing the basic routines that help to transfer information between elements within computer 802, such as during start-up, is typically stored in ROM 812. RAM 810 typically contains data and/or program modules/instructions that are immediately accessible to and/or being presently operated on by processing unit 804.

Computer 802 may also include other removable/non-removable and/or volatile/non-volatile storage media. By way of example, FIG. 8 illustrates a hard disk drive or disk drive array 816 for reading from and writing to a (typically) non-removable, non-volatile magnetic media (not separately shown); a magnetic disk drive 818 for reading from and writing to a (typically) removable, non-volatile magnetic disk 820 (e.g., a "floppy disk"); and an optical disk drive 822 for reading from and/or writing to a (typically) removable, non-volatile optical disk 824 such as a CD, DVD, or other optical media. Hard disk drive 816, magnetic disk drive 818, and optical disk drive 822 are each connected to system bus 808 by one or more storage media interfaces 826. Alternatively, hard disk drive 816, magnetic disk drive 818, and optical disk drive 822 may be connected to system bus 808 by one or more other separate or combined interfaces (not shown).

The disk drives and their associated processor-accessible media provide non-volatile storage of processor-executable instructions, such as data structures, program modules, and other data for computer 802. Although exemplary computer 802 illustrates a hard disk 816, a removable magnetic disk 820, and a removable optical disk 824, it is to be appreciated that other types of processor-accessible media may store instructions that are accessible by a device, such as magnetic cassettes or other magnetic storage devices, flash memory, compact disks (CDs), digital versatile disks (DVDs) or other optical storage, RAM, ROM, electrically-erasable programmable read-only memories (EEPROM), and so forth. Such media may also include so-called special purpose or hard-wired IC chips. In other words, any processor-accessible media may be utilized to realize the storage media of the exemplary operating environment 800.

Any number of program modules (or other units or sets of instructions/code) may be stored on hard disk 816, magnetic disk 820, optical disk 824, ROM 812, and/or RAM 840, including by way of general example, an operating system 828, one or more application programs 830, other program modules 832, and program data 834. Such instructions may include module(s) for joining and participating in an ad hoc wireless network, module(s) for requesting and receiving bandwidth allocations, module(s) for bandwidth allocation procedures, data structure(s) to retain unserviced bandwidth amounts, and so forth.

A user may enter commands and/or information into computer 802 via input devices such as a keyboard 836 and a pointing device 838 (e.g., a "mouse"). Other input devices 840 (not shown specifically) may include a microphone, joystick, game pad, satellite dish, serial port, scanner, and/or the like. These and other input devices are connected to processing unit 804 via input/output interfaces 842 that are coupled to system bus 808. However, input devices and/or output devices may instead be connected by other interface and bus structures, such as a parallel port, a game port, a universal serial bus (USB) port, an infrared port, an IEEE 1394 ("Firewire") interface, an IEEE 802.11 or 802.15 or other general wireless interface, a Bluetooth® wireless interface, and so forth.

A monitor/view screen 844 or other type of display device may also be connected to system bus 808 via an interface, such as a video adapter 846. Video adapter 846 (or another component) may be or may include a graphics card for processing graphics-intensive calculations and for handling demanding display requirements. Typically, a graphics card includes a graphics processing unit (GPU), video RAM (VRAM), etc. to facilitate the expeditious display of graphics and the performance of graphics operations. In addition to monitor 844, other output peripheral devices may include components such as speakers (not shown) and a printer 848, which may be connected to computer 802 via input/output interfaces 842.

Computer 802 may operate in a networked environment using logical connections to one or more remote computers, such as a remote computing device 850. By way of example, remote computing device 850 may be a personal computer, a portable computer (e.g., laptop computer, tablet computer, PDA, mobile station, etc.), a palm or pocket-sized computer, a watch, a gaming device, a server, a router, a network computer, a peer device, another network node, or another device type as listed above, and so forth. However, remote computing device 850 is illustrated as a portable computer that may include many or all of the elements and features described herein with respect to computer 802.

Logical connections between computer 802 and remote computer 850 are depicted as a local area network (LAN) 852 and a general wide area network (WAN) 854. Such networking environments are commonplace in offices, enterprise-wide computer networks, intranets, the Internet, fixed and mobile telephone networks, ad-hoc and infrastructure wireless networks, other wireless networks, gaming networks, some combination thereof, and so forth. Such networks and communications connections are examples of transmission media.

When implemented in a LAN networking environment, computer 802 is usually connected to LAN 852 via a network interface or adapter 856. When implemented in a WAN networking environment, computer 802 typically includes a modem 858 or other component for establishing communications over WAN 854. Modem 858, which may be internal or external to computer 802, may be connected to system bus 808 via input/output interfaces 842 or any other appropriate mechanism(s). It is to be appreciated that the illustrated network connections are exemplary and that other manners for establishing communication link(s), including wireless link (s), between computers 802 and 850 may be employed.

In a networked environment, such as that illustrated with operating environment 800, program modules or other instructions that are depicted relative to computer 802, or portions thereof, may be fully or partially stored in a remote media storage device. By way of example, remote application programs 860 reside on a memory component of remote computer 850 but may be usable or otherwise accessible via computer 802. Also, for purposes of illustration, application programs 830 and other processor-executable instructions such as operating system 828 are illustrated herein as discrete blocks, but it is recognized that such programs, components, and other instructions reside at various times in different storage components of computing device 802 (and/or remote computing device 850) and are executed by processor(s) 804 of computer 802 (and/or those of remote computing device 850).

Although systems, media, devices, methods, procedures, apparatuses, techniques, schemes, approaches, procedures, arrangements, and other implementations have been described in language specific to structural, logical, algorithmic, and functional features and/or diagrams, it is to be understood that the invention defined in the appended claims is not necessarily limited to the specific features or diagrams described. Rather, the specific features and diagrams are disclosed as exemplary forms of implementing the claimed invention.

The invention claimed is:

1. One or more storage media comprising processor-executable instructions that, when executed, direct a device to perform actions comprising:
   receiving from an entity a bandwidth allocation request stipulating a requested bandwidth amount for a stream of the entity for a current superframe;
   determining an unserviced bandwidth amount from an immediate previous superframe;
   determining an allocated bandwidth amount for the stream of the entity based, at least in part, on the unserviced bandwidth amount; and
   updating a reserved bandwidth amount of the stream of the entity for the current superframe using a weighted average of
   current requested bandwidth amount,
   the unserviced bandwidth amount, and
   a previous reserved bandwidth amount of the stream of the entity from the immediate previous superframe.

2. The one or more storage media as recited in claim 1, comprising the processor-executable instructions that, when executed, direct the device to perform a further action comprising:
   transmitting an allocation broadcast that includes the allocated bandwidth amount to the entity.

3. The one or more storage media as recited in claim 1, wherein the updating using a smoothing factor which modulates how quickly the reserved bandwidth amount changes from one superframe to another.

4. The one or more storage media as recited in claim 1, wherein the action of receiving comprises an action of:
   receiving the bandwidth allocation request via a wireless communication.

5. The one or more storage media as recited in claim 1, wherein the action of ascertaining comprises an action of:
   retrieving from memory the unserviced bandwidth amount.

6. The one or more storage media as recited in claim 1, wherein the action of determining comprises an action of:
   assigning at least one bandwidth unit to the unserviced bandwidth amount.

7. The one or more storage media as recited in claim 6, wherein the at least one bandwidth unit comprises at least one time unit.

8. The one or more storage media as recited in claim 6, wherein the action of determining further comprises an action of:
   assigning at least one bandwidth unit to a reserved bandwidth amount of the stream of the entity.

9. The one or more storage media as recited in claim 8, wherein the action of determining further comprises an action of:
   assigning at least one bandwidth unit to an overloaded bandwidth amount of the stream of the entity after the assigning of the at least one bandwidth unit to the unserviced bandwidth amount and to the reserved bandwidth amount.

10. The one or more storage media as recited in claim 9, comprising the processor-executable instructions that, when executed, direct the device to perform a further action comprising:
    combining the at least one bandwidth unit assigned to the unserviced bandwidth amount, the at least one bandwidth unit assigned to the reserved bandwidth amount, and the at least one bandwidth unit assigned to the overloaded bandwidth amount into an allocated bandwidth amount comprising a time slot to be allocated to the stream of the entity for the current superframe.

11. The one or more storage media as recited in claim 8, comprising the processor-executable instructions that, when executed, direct the device to perform a further action comprising:
    detecting if an available bandwidth resource for the current superframe has been exhausted after the action of assigning at least one bandwidth unit to the reserved bandwidth amount of the stream of the entity;
    if not, assigning at least one bandwidth unit to an overloaded bandwidth amount of the stream of the entity.

12. A device comprising:
    at least one processor; and
    one or more media including processor-executable instructions that are capable of being executed by the at least one processor, the processor-executable instructions adapted to direct the device to perform actions comprising:
    receiving from an entity a bandwidth allocation request stipulating a requested bandwidth amount for a stream of the entity for a current superframe;
    ascertaining an unserviced bandwidth amount of the stream of the entity from an immediate previous superframe;
    determining an allocated bandwidth amount for the stream of the entity based on the unserviced bandwidth amount; and
    updating a reserved bandwidth amount of the stream of the entity for the current superframe using a weighted average of
    current requested bandwidth amount,
    the unserviced bandwidth amount, and
    a previous reserved bandwidth amount of the stream of the entity from the immediate previous superframe.

13. The device as recited in claim 12, wherein the device further comprises:
    a transceiver that is adapted to transmit and receive wireless communications and is capable of facilitating the action of receiving from an entity a bandwidth allocation request.

14. The device as recited in claim 12, wherein the entity comprises at least one of a user or another device.

15. The device as recited in claim 12, wherein the requested bandwidth amount for the current superframe includes the unserviced bandwidth amount from the immediate previous superframe without separately designating the unserviced bandwidth amount.

16. The device as recited in claim 12, wherein the ascertaining action comprises:

retrieving the unserviced bandwidth amount from the one or more media.

17. The device as recited in claim 12, wherein the device is capable of operating under an IEEE 802.15.3 standard in accordance with a time division multiple access (TDMA) technology.

18. The device as recited in claim 12, wherein the processor-executable instructions are adapted to direct the device to perform a further action comprising:

segmenting the requested bandwidth amount into a newly-arrived bandwidth amount of the stream of the entity and the unserviced bandwidth amount;

wherein the determining action comprises:

assigning a number of bandwidth units equaling the unserviced bandwidth amount prior to assigning any bandwidth units to the newly-arrived bandwidth amount.

19. The device as recited in claim 18, wherein the processor-executable instructions are adapted to direct the device to perform a further action comprising:

assigning at least one bandwidth unit to an unserviced bandwidth amount of another stream of another entity prior to assigning a bandwidth unit to the newly-arrived bandwidth amount of the stream of the entity.

20. The device as recited in claim 12, wherein the determining action comprises:

assigning at least one bandwidth unit to the unserviced bandwidth amount first;

assigning at least one bandwidth unit to a reserved bandwidth amount of the stream of the entity second;

computing an overloaded bandwidth amount of the stream of the entity by subtracting the unserviced bandwidth amount and the reserved bandwidth amount from the requested bandwidth amount; and assigning at least one bandwidth unit to the overloaded bandwidth amount third if any bandwidth units remain available.

21. The device as recited in claim 12, wherein the processor-executable instructions are adapted to direct the device to perform further actions comprising:

calculating the unserviced bandwidth amount for the immediate previous superframe when determining an allocated bandwidth amount for the stream of the entity for the immediate previous superframe; and retaining, from the immediate previous superframe to the current superframe, the unserviced bandwidth amount using the one or more media for utilization in the action of ascertaining.

22. A method for bandwidth allocation, the method comprising:

receiving from multiple entities for multiple streams current bandwidth allocation requests stipulating current requested bandwidth amounts for the multiple streams of the multiple entities;

segmenting the current requested bandwidth amounts into current newly-arrived bandwidth amounts and immediate previous unserviced bandwidth amounts associated with the multiple streams of the multiple entities;

assigning bandwidth units to the immediate previous unserviced bandwidth amounts;

detecting if available bandwidth units have been consumed in the assigning; and if available bandwidth units have not been consumed in the assigning, assigning the available bandwidth units to the current newly-arrived bandwidth amounts according to current reserved bandwidth amounts for the multiple streams of the multiple entities based on a smoothing factor.

23. The method as recited in claim 22, further comprising:

if available bandwidth units have been consumed in the assigning, calculating current unallocated bandwidth amounts for the multiple streams of the multiple entities and noting the current unallocated bandwidth amounts for subsequent use in segmenting subsequent requested bandwidth amounts.

24. The method as recited in claim 23, further comprising:

detecting if remaining available bandwidth units have been consumed in the two assignings; and if not, assigning the remaining available bandwidth units to current overloaded bandwidth amounts of the multiple streams of the multiple entities in ascending order.

25. The method as recited in claim 22, further comprising:

updating previous reserved bandwidth amounts for the multiple streams of the multiple entities to create the current reserved bandwidth amounts using at least the current newly-arrived bandwidth amounts.

26. The method as recited in claim 22, further comprising:

calculating current unserviced bandwidth amounts for the multiple streams of the multiple entities by deducting assigned bandwidth units of one or more assignments from the current requested bandwidth amounts.

27. The method as recited in claim 22, wherein the bandwidth units comprise time units; and further comprising:

combining assigned bandwidth units of one or more assignments into allocated time slots for the multiple streams of the multiple entities; and sending positions and durations of the allocated time slots for the multiple streams to the multiple entities in at least one allocation broadcast.

28. One or more processor-accessible media comprising processor-executable instructions that, when executed, direct a device to perform the method as recited in claim 22.

29. An arrangement for bandwidth allocation, comprising:

ascertainment means for ascertaining respective immediate previous unserviced bandwidth amounts associated with respective streams;

determination means for determining respective current allocated bandwidth amounts for the respective streams based on the ascertained respective immediate previous unserviced bandwidth amounts; and updating means for updating reserved bandwidth amounts of the respective streams using weighted averages of current requested bandwidth amounts, the ascertained respective immediate previous unserviced bandwidth amounts, and previous reserved bandwidth amounts of the respective streams.

30. The arrangement as recited in claim 29, further comprising:

transceiver means for transceiving wireless communications;

wherein the transceiver means comprises:

receiving means for receiving from respective entities respective bandwidth allocation requests stipulating respective current requested bandwidth amounts for the respective streams; and transmission means for transmitting to the entities at least one allocation broadcast including the determined respective current allocated bandwidth amounts for the respective streams.

31. The arrangement as recited in claim 30, wherein the determination means further determines the respective current allocated bandwidth amounts for the respective streams responsive to the respective bandwidth allocation requests stipulating the respective current requested bandwidth amounts.

32. The arrangement as recited in claim 29, further comprising:

segmentation means for segmenting respective current requested bandwidth amounts into respective current newly-arrived bandwidth amounts and the ascertained respective immediate previous unserviced bandwidth amounts;

wherein the determination means comprises:

assignment means for assigning bandwidth amounts to the ascertained previous unserviced bandwidth amounts prior to the current newly-arrived bandwidth amounts.

33. The arrangement as recited in claim 32, wherein the assignment means further assigns available bandwidth amounts to the current newly-arrived bandwidth amounts prior to respective current overloaded bandwidth amounts of the respective streams; and wherein the determination means further comprises:

detection means for detecting if a time resource of assignable bandwidth amounts is exhausted;

wherein the assignment means ceases assigning bandwidth amounts if the time resource of assignable bandwidth amounts is detected as being exhausted by the detection means.

34. One or more storage media containing instructions that, when executed, direct a device to allocate bandwidth by performing a method, the method comprising:

ascertaining respective immediate previous unserviced bandwidth amounts associated with a plurality of streams;

determining respective current allocated bandwidth amounts for the respective streams based on the ascertained respective immediate previous unserviced bandwidth amounts; and updating reserved bandwidth amounts of the respective streams using weighted averages of current requested bandwidth amounts, the ascertained respective immediate previous unserviced bandwidth amounts, and previous reserved bandwidth amounts of the respective streams.

* * * * *